United States Patent [19]

Takeuchi

[11] 4,185,203
[45] Jan. 22, 1980

[54] CLOSED LOOP ROTATIONAL SPEED CONTROL SYSTEM FOR TWIN-SHAFT TYPE GAS TURBINE ELECTRIC GENERATOR

[75] Inventor: Tohru Takeuchi, Zushi, Japan

[73] Assignee: Nissan Motor Company, Limited, Japan

[21] Appl. No.: 897,678

[22] Filed: Apr. 19, 1978

[30] Foreign Application Priority Data

Apr. 23, 1977 [JP] Japan .................................. 52/46977

[51] Int. Cl.² .......................... F02C 9/04; G05D 13/00
[52] U.S. Cl. ..................................... 290/40 C; 290/14; 290/51; 322/18
[58] Field of Search ...................... 290/14, 40 R, 40 A, 290/40 B, 40 C, 51, 52; 60/39.28 R; 322/18, 21, 22, 23

[56] References Cited

U.S. PATENT DOCUMENTS

| | | | |
|---|---|---|---|
| 3,198,954 | 8/1965 | Eggenberger et al. | 290/40 R |
| 3,621,370 | 11/1971 | Vandervort | 290/40 A X |
| 3,771,821 | 11/1973 | Rist et al. | 290/14 |
| 3,943,371 | 3/1976 | Yannone et al. | 290/40 B |
| 3,943,373 | 3/1976 | Yannone et al. | 290/40 R |

Primary Examiner—Gene Z. Rubinson
Assistant Examiner—W. E. Duncanson, Jr.
Attorney, Agent, or Firm—Robert E. Burns; Emmanuel J. Lobato; Bruce L. Adams

[57] ABSTRACT

A reference signal generator generates a variable reference signal with which a signal indicating the momentary rotational speed of the prime mover (such as a gas turbine) for a generator is compared, to produce a rotational speed control signal in accordance with a signal representing the load applied to the prime mover, so as to compensate for the rotational speed fluctuation caused by load connection by holding the rotational speed of the prime mover above the desired level during no-load operation and at the desired level under load.

10 Claims, 12 Drawing Figures

CLOSED LOOP ROTATIONAL SPEED CONTROL SYSTEM FOR TWIN-SHAFT TYPE GAS TURBINE ELECTRIC GENERATOR

FIELD OF THE INVENTION

The present invention generally relates to twinshaft gas turbine engines for generating electricity and more particularly to a speed control system of such gas turbine.

BACKGROUND OF THE INVENTION

Prime movers for driving a generator are subjected to the legal requirement that within a stipulated short period of time after interruption of services a predetermined electric voltage must be supplied.

Therefore, the prime movers for a generator must satisfy two requirements, one being that time required for start-up of prime mover be short enough to meet the above-mentioned legal requirement and, the other being that variation in rotational speed of a power turbine shaft of prime mover against load variations imposed on the power turbine shaft be small with a view for maintaining its output voltage frequencies constant.

It is well known that there are two types of gas turbines, i.e. a single-shaft type and a twin-type.

Twin-shaft gas turbine engines are suitable as a prime mover for driving a generator in that start-up time is short enough to satisfy the first requirement because a compressor drive shaft is accelerated irrespectively of a power turbine shaft. However, since, in the twin-shaft gas turbine engines, inertia moment of a power turbine shaft is not great, there is a considerably large variation in rotational speed of the power turbine shaft against load variations imposed on the power turbine, whereby they fail to satisfy the second requirement.

In a known system, the rotational speed of the power turbine shaft is controlled by controlling the amount of fuel supplied to the combustor of the gas turbine. The fuel is controlled in accordance with a signal produced by detecting the difference between a rotational speed of the power turbine shaft and a reference signal representative of a rated or desired rotational speed. This kind of closed loop fuel control system effectively works when the variation of the rotational speed of the power turbine shaft occurs gradually or slowly. However, when the rotational speed of the power turbine shaft varies suddenly for instance when the load is connected or disconnected, above-mentioned conventional type of closed loop fuel control system does not perform adequate feedback control and thus the rotational speed is apt to be out of an allowable range.

SUMMARY OF THE INVENTION

According to the present invention, during no load operation the rotational speed of the gas turbine is maintained above that required to produce an electric current having the desired frequency by the closed loop system so that upon connection of load to the generator driven by the turbine the rotational speed of the output shaft of the turbine is rapidly reduced in the direction of the rated or desired speed. Thus the closed loop system can rapidly adjust and hold the rotational speed of the turbine at the rated or desired level and avoid an undesirably long period in which the frequency of the generated current fluctuates. Upon disconnection of the load closed loop system once again raises the rotational speed of the turbine to for example 105% of the rated or desired speed.

To achieve the above control the closed loop system includes a reference signal generator which receives a signal indicative of the load applied to the prime mover and produces (generates) a variable reference signal with which a signal indicating the rotational speed of the prime mover output shaft is compared, in a control unit, to produce a rotational speed control signal.

Therefore an object of the present invention is to provide a closed loop rotational speed control system for a prime mover of a generator in which the rotational speed is immediately regulated toward a rated or desired speed irrespective of the load being connected or disconnected.

BRIEF DESCRIPTION OF THE DRAWINGS

Other features and advantages of the present inventiol will become more readily apparent from the following detailed description taken in conjunction with the accompanying drawings in which.

DETAILED DESCRIPTION OF THE PREFERRED EMBODIMENTS

Figure 1:
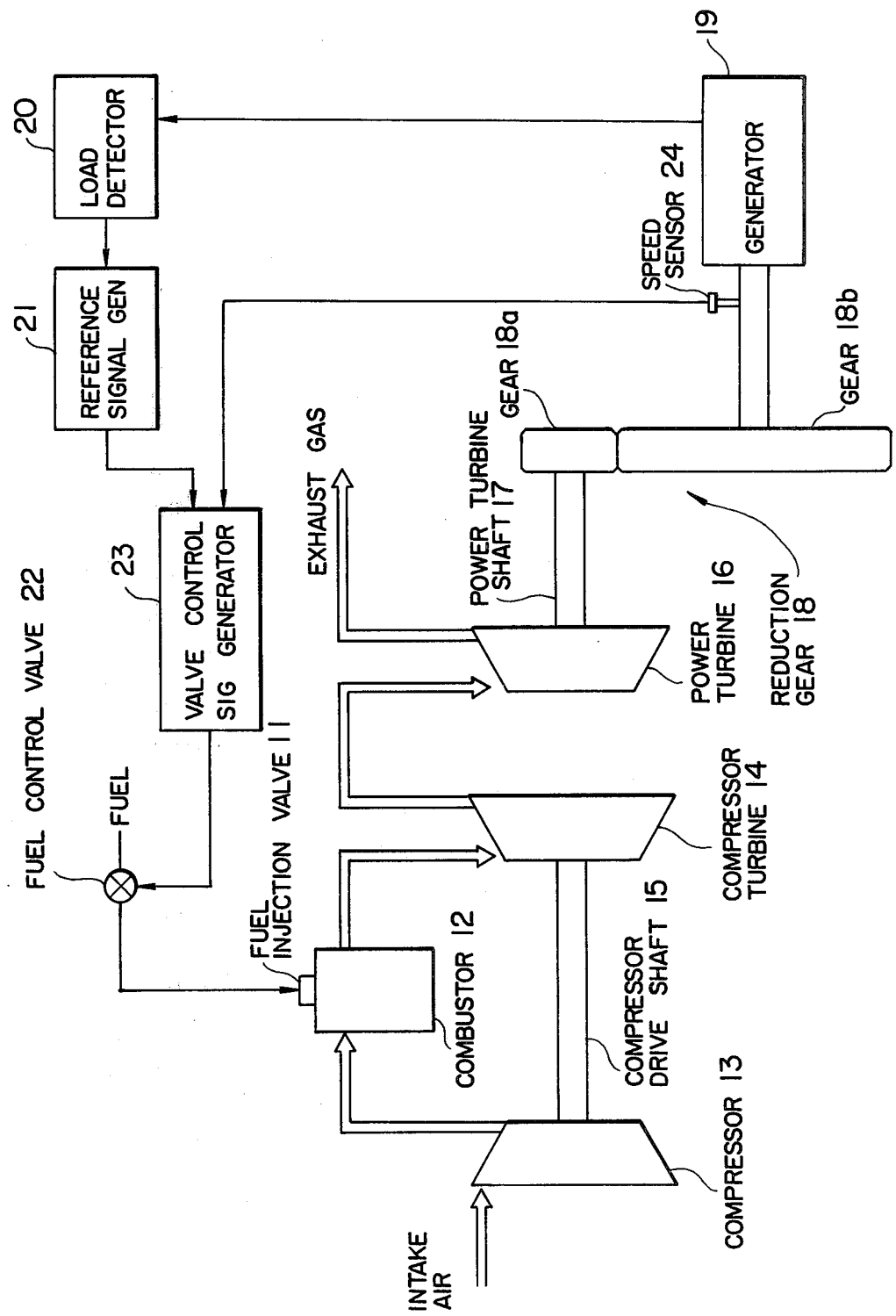
FIG. 1 shows a twin-shaft type gas turbine engine of a generator equipped with a closed loop rotational speed control system according to the present invention.

Reference is now made to FIG. 1 which shows a gas turbine engine equipped with a closed loop fuel control system according to the present invention. Fuel is supplied to a combustor 12 or a combustion chamber via a fuel control valve 22 and a fuel injection valve 11 while intake air is fed to the combustor 12 after compression in a compressor 13. High pressure and temperature combustion gas is produced in the combustor 12 and is directed against a compressor turbine 14 so as to rotate same. The rotation of the compressor turbine 14 is transmitted via a compressor drive shaft 15 to the compressor 13. The high temperature, pressure gas applied to the compressor turbine 14 is then applied to a power turbine 16 to rotate same. The gas, after being applied to the power turbine, is exhausted to the atmosphere as an exhaust gas. A heat exchanger may be provided along an exhaust pipe (not shown).

The rotation of the power turbine 16 is transmitted via a power turbine shaft 17 and a suitable reduction gear 18, shown to include a small gear 18a and a large gear 18b, to a generator 19. A speed sensor 24 such as a tacho-generator or a pulse pick-up is provided to detect the rotational speed of the generator 19 and thus produces an output signal representative of the rotational speed. The output of the speed sensor 24 is supplied to a valve control signal generator 23. The valve control signal generator 23 is arranged to generate an output signal with which the fuel control valve 22 is controlled by comparing the magnitude of the output signal of the speed sensor 24 with a reference signal supplied to the valve control signal generator 23. Therefore the fuel control valve 22 controls the fuel flow rate in accordance with the detected rotational speed to maintain a predetermined rotational speed of the power turbine shaft 17.

In above-mentioned arrangement if the reference signal is constant, the closed loop fuel control system is the same as the conventional type. However, in the present invention the reference signal is produced in a reference signal generator 21 as shown in FIG. 1 and the reference signal varies in accordance with the variation of the load of the power turbine 16.

An output of the generator 19 is connected to a load detector 20 where the load detector produces an output signal indicating the load of the power turbine 16. The load detector 20 may be arranged with a voltage detector, a current detector and a multiplier where the load detector 20 produces an analogue signal by multiplying the output voltage and the output current of the generator 19. The output signal of the load detector 20 is connected to the reference signal generator 21 so that the reference signal generator 21 generates a variable reference signal in accordance with the output signal of the load detector 20.

Figure 2:
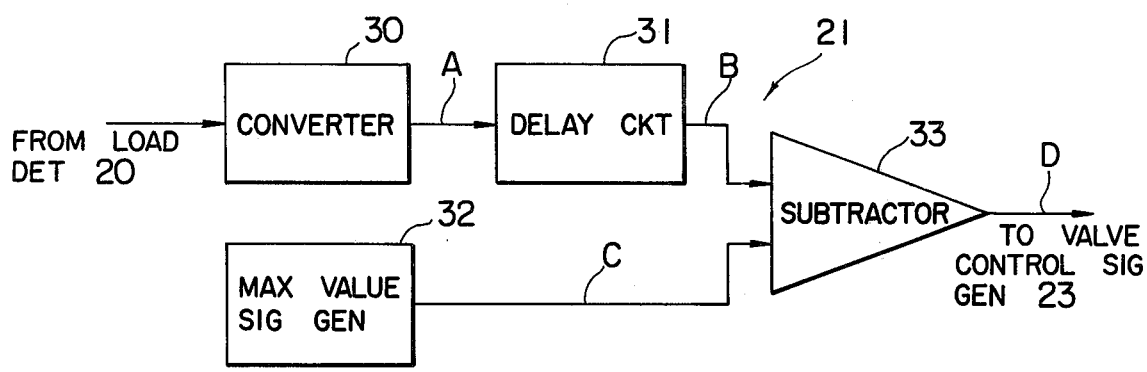
FIG. 2 to FIG. 4 show first to third embodiments of a reference signal generator shown in FIG. 1.

Reference is now made to FIG. 2 which shows a first embodiment of the reference signal generator 21 shown in FIG. 1. The reference signal generator 21 includes a converter 30, a delay circuit 31, a maximum value signal generator 32 and a subtractor 33. The converter consists of an operational amplifier and is arranged to produce an output signal A corresponding to a rotational speed of the power turbine 16 in response to the output signal of the load detector 20. The delay circuit is connected to the converter 30 and thus produces an output signal B with a predetermined delay in response to the signal A. The maximum value signal generator 32 generates an output signal C corresponding to a predetermined maximum rotational speed of the power turbine 16. The signal C, in the preferred embodiment, is selected to correspond to 105% of the rated rotational speed of the power turbine 16. Above-described signals respectively produced in the delay circuit 31 and the maximum value signal generator 32 are respectively supplied to the subtractor 33 where the subtractor 33 produces an output signal D by subtracting the magnitude of the signal B from that of signal C. The output signal D is supplied to the valve control signal generator 23 shown in FIG. 1.

Figure 3:
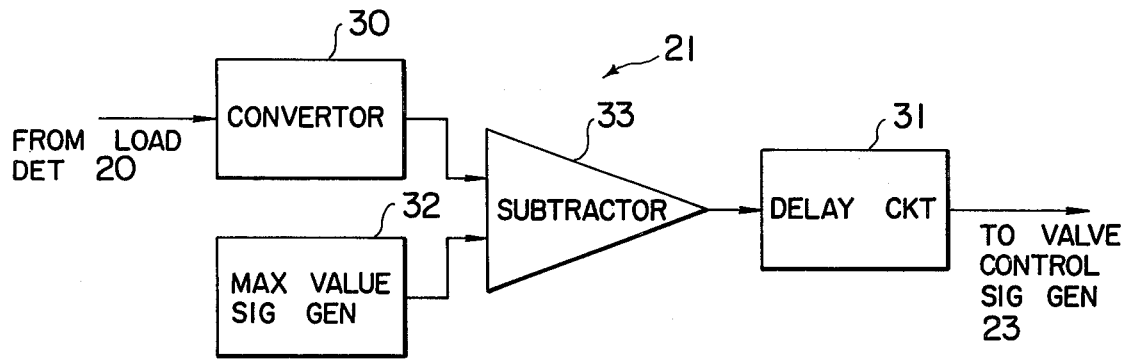
Figure 4:
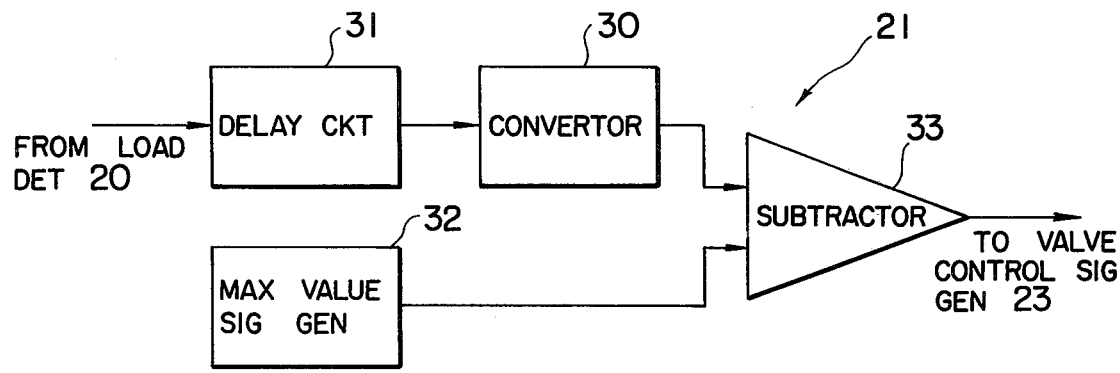

The delay circuit 31 shown in FIG. 2 may be provided between the output of the subtractor 33 and the input of the valve control signal generator 23 or the delay circuit 31 may be interposed between the output of the load detector 20 and the input of the converter 30. Hence FIG. 3 and FIG. 4 show above-described arrangement of the reference signal generator 21. The functions of reference signal generators shown in FIG. 3 and FIG. 4 are substantially same as that in FIG. 2 so descriptions thereof are omitted.

Figure 5:
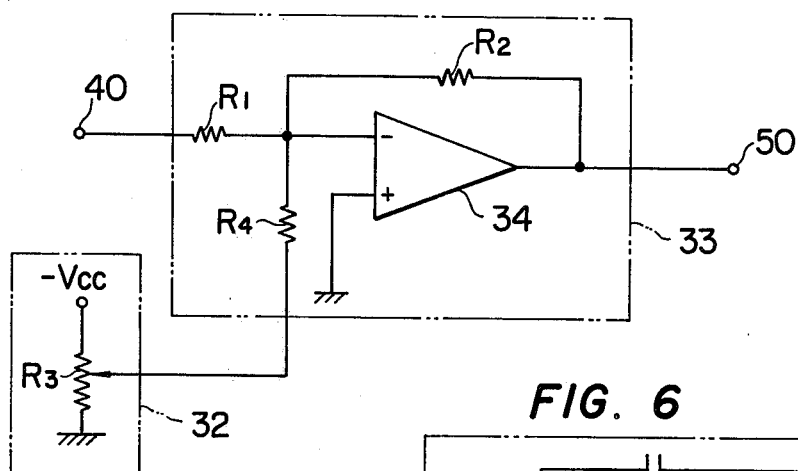
FIG. 5 shows a circuit including a maximum value signal generator and a subtractor shown in FIG. 2.

Reference is now made to FIG. 5 which shows a circuit including the maximum value signal generator 32, and the subtractor 33 shown in FIGS. 2, 3 and 4. The circuits 32 and 33 include an operational amplifier 34 and four resistors $R_1$, $R_2$, $R_3$, $R_4$. The resistor $R_1$ is interposed between an input terminal 40 and an inverting input of the operational amplifier 34 while a feedback resistor $R_2$ is connected across the output and the inverting input of the operational amplifier 34. The resistor $R_3$ with a contact member is a potentiometer or a voltage divider interposed between a negative terminal $-V_{CC}$ of a power source and ground. The divided voltage produced by the potentiometer is applied via a resistor $R_4$ to the inverting input of the operational amplifier 34. The non-inverting input of the operational amplifier 34 is connected to ground. The output of the operational amplifier 34 is coupled to an output terminal 50.

The input terminal 40 and the output terminal 50 may be respectively connected, when the circuit shown in FIG. 5 is utilized as shown in FIG. 2, to the output of the delay circuit 31 and to the input of the valve control signal generator 23. However, when the circuit is utilized as shown in FIG. 3 or FIG. 4, the input terminal 40 may be respectively connected to the output of the converter 30 and to the input of the delay circuit 31.

A description of the operation of the circuit will now be made. The input signal from the input terminal 40 and a negative voltage produced by the potentiometer $R_3$ are respectively applied via resistors $R_1$, $R_4$ to the inverting input of the operational amplifier 34 so that these two signals are added to each other at the inverting input. The input signal of the operational amplifier 34 is then amplified and inverted and thus an output voltage produced at the output of the operational amplifier 34 indicating the difference between the magnitude of the input signal at the input terminal 40 and the absolute value of the divided voltage.

Figure 6:
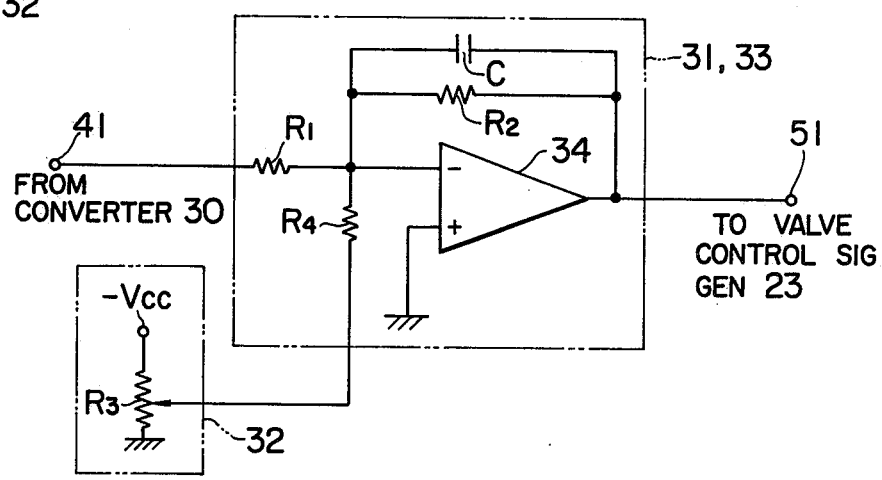
FIG. 6 shows a circuit including a maximum value signal generator, a subtractor and a delay circuit shown in FIG. 3.

Reference is now made to FIG. 6 which shows an another circuit which further includes the delay circuit 31. The circuit shown in FIG. 6 is the same as that shown in FIG. 5 except that a capacitor C is connected in parallel with the feedback resistor $R_2$. Since the capacitor C is provided across the output and the input of the operational amplifier 34, the operational amplifier 34 produces its output signal with some delay. This means that the circuit shown in FIG. 6 includes a delay circuit 31 shown in FIG. 3. Therefore the input terminal 41 is connected to the output of the converter 30 while the output terminal 51 is connected to the input of the valve control signal generator 23. Other functions and operations of the circuit shown in FIG. 6 are the same as that shown in FIG. 5 therefore the description thereof is omitted.

Figure 7:
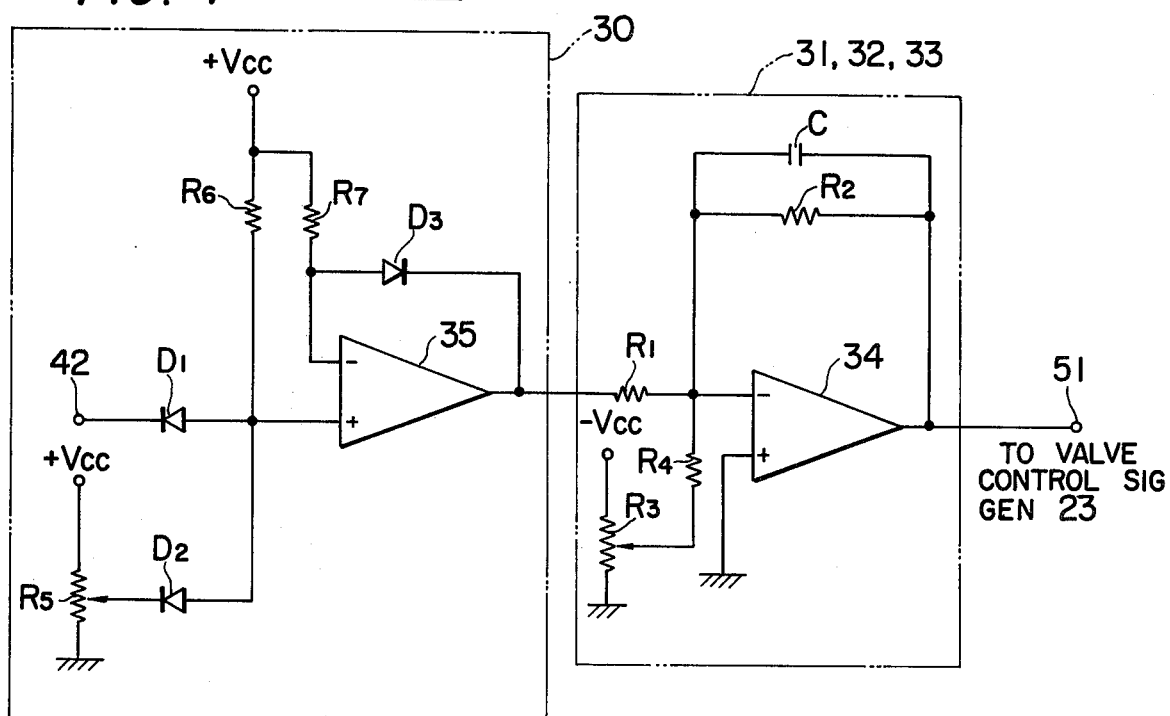
FIG. 7 shows a circuit including a limiter circuit, a maximum value signal generator, a subtractor and a delay circuit shown in FIG. 4.

Reference is now made to FIG. 7 which shows another circuit of the reference signal generator 21. The circuit shown in FIG. 3 includes the converter 30, the maximum value detector 31, the subtractor 33 and the delay circuit 31. The circuit shown in FIG. 7 is the same as the circuit shown in FIG. 6 except that a limiter circuit is provided as the converter 30.

The limiter circuit includes an operational amplifier 35, a pair of diodes $D_1$, $D_2$, a feedback diode $D_3$, a pair of resistors $R_6$, $R_7$ and a potentiometer $R_5$. A first diode $D_1$ is interposed between an input terminal 42 and the non-inverting input of the operational amplifier 35 in a direction where the cathode of same is connected to the input terminal 42. The potentiometer $R_5$ is interposed between a positive terminal $+V_{CC}$ of a power source and ground. A divided voltage is arranged to be applied to the cathode of a second diode $D_2$ while the anode of same is connected to the non-inverting input of the operational amplifier 35. A resistor $R_6$ is provided between the positive terminal $+V_{CC}$ of the power source and the non-inverting input of the operational amplifier 35. The other resistor $R_7$ is interposed between the positive terminal $+V_{CC}$ and an inverting input of the operational amplifier 35. The cathode of the feedback diode $D_3$ is coupled to the output of the operational amplifier 35 while the anode of same is connected to the inverting input of the operational amplifier 35.

A description of the function and the operation of the limiter circuit shown in FIG. 7 will now be made. Since a predetermined voltage is applied to the second diode $D_2$, the lower one of the two voltages respectively applied to the pair of diodes $D_1$, $D_2$ is selected and thus supplied to the non-inverting input of the operational amplifier 35. The feedback diode $D_3$ is connected in an opposite direction with respect to the pair of diodes $D_1$, $D_2$ in order to compensate for a voltage drop across the diode $D_1$ or $D_2$. With this arrangement the limiter circuit shown in FIG. 7 produces an output signal proportional to the input signal applied to the input terminal 42 when the magnitude of the input signal is less than the divided voltage produced by the potentiometer $R_5$ while the output signal is maintained at a voltage proportional to the divided voltage when the magnitude of the input signal is over the divided voltage.

Above-mentioned delay circuit shown in FIG. 6 and FIG. 7 has a time constant (for example two to ten seconds). A delay circuit includes in the reference signal generator 21 is preferably constructed with a circuit having a time lag of a first order where the time constant is selected in accordance with the characteristics of the prime mover as described hereinbefore. However, the delay circuit may be constructed with a circuit, the transfer function of which is indicated by $e^{-LS}$ where the L (dead time element) is selected between 0.2 and 5 seconds, and the S is a differential operator.

Figure 8:
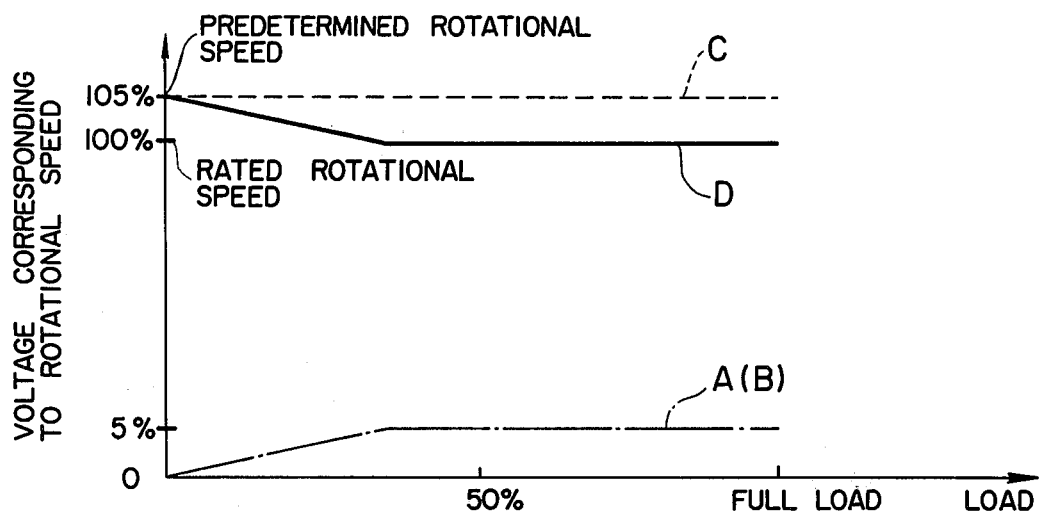
FIG. 8 to FIG. 12 are explanatory graphs of signals produced in the reference signal generator shown in FIG. 2.

Reference is now made to FIG. 8 which shows an explanatory graph of signals produced by the reference signal generator 21 shown in FIG. 2. The converter 30 shown in FIG. 2 is assumed to be constructed with a limiter circuit as shown in FIG. 7 and the output signal of the converter 30 is denoted by A. The output signal of the delay circuit 31 is denoted by B. The maximum value signal generator 32 is assumed to produce its output signal, denoted by C, which corresponds to 105% of the rated rotational speed (100%) of the power turbine 16. The output signal of the subtractor 33 is denoted by D.

As shown in FIG. 8, the signal A which indicates the load of the power turbine 16 increases as the load increases until the signal A reaches a predetermined level which corresponds to 5% of the rated rotational speed. The signal A does not increase after it has reached the predetermined level and stays at the predetermined level irrespectively of the increase of the load. The signal B is also indicated by the same line as signal A. Since the signal C which indicates a maximum value is constant, the level of the signal C is constant. The signal D is produced by subtracting the value of the signal B from the value of signal C. Therefore the signal D decreases as the signal A increases and the signal D is maintained at a constant level corresponding to 100% of the rated rotational speed where the load is over the predetermined level.

Figure 9:
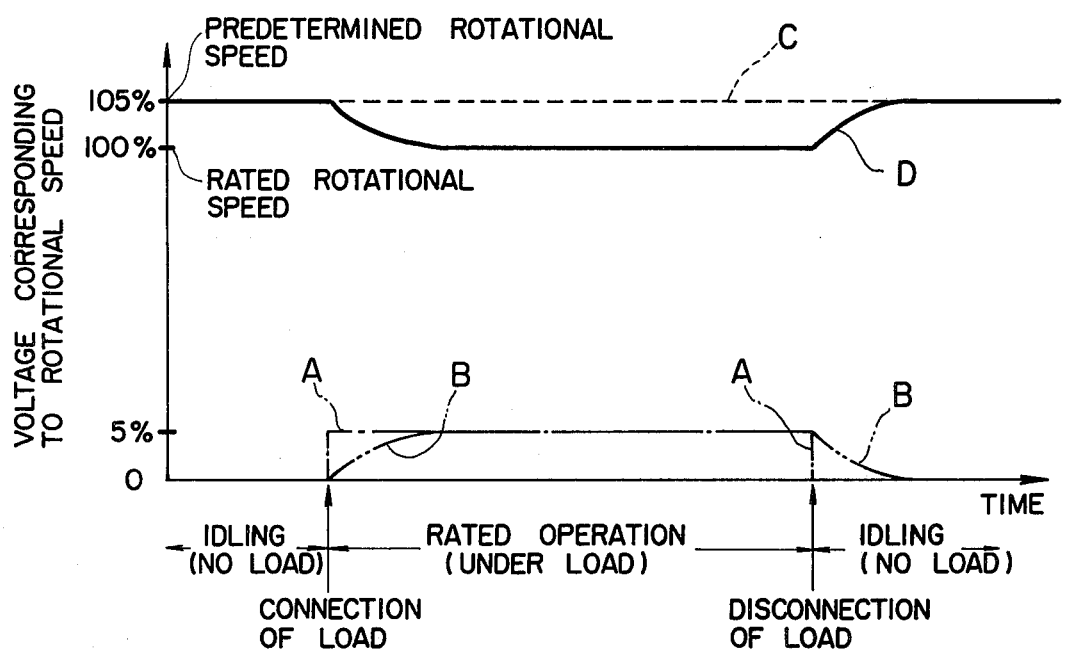

FIG. 9 illustrates the relationship between signals A, B, C, D with respect to time. The signal C is maintained at 105% of the rated speed during an idling operation, i.e. with no load, compensating for the speed reduction induced by the connection of load. When the load is connected the signal A rises with a step response. The signal B increases gradually because of a delay time until it reaches a predetermined level. Therefore the signal D, with which the fuel flow rate is controlled, decreases gradually until the signal B reaches the rated rotational speed. When the load is disconnected though the signal A suddenly decreases, the signal B gradually decreases and the signal D gradually increases. This means that the signal D is once again maintained at 105% of the rated speed again after a short period of time determined by the time constant after disconnection of the load.

Figure 10:
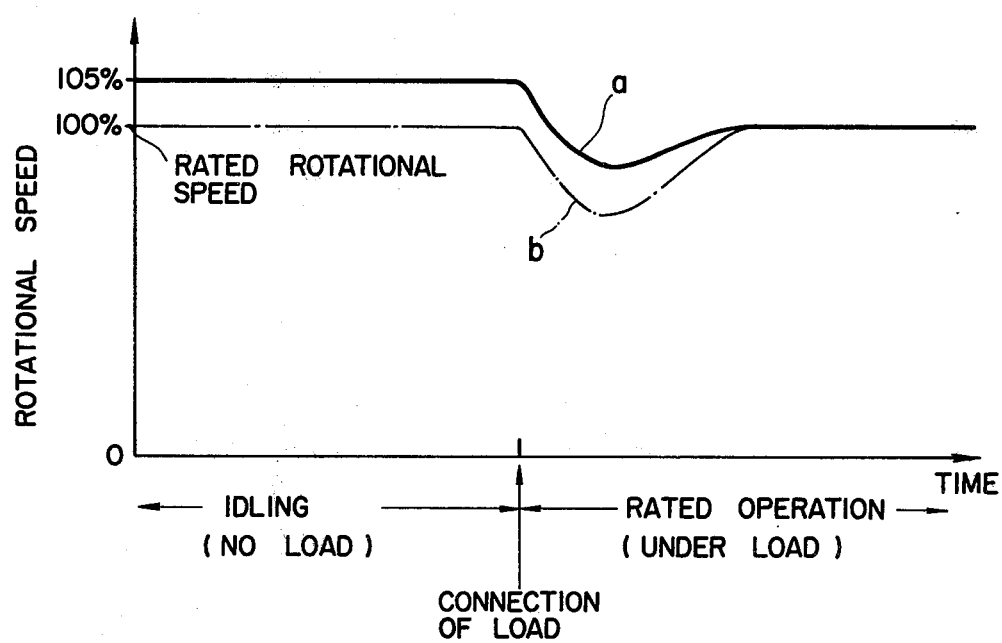

Reference is now made to FIG. 10 which shows the actual rotational speed of the power turbine 16. The line "a" shows the rotational speed of the power turbine 16 according to the present invention while the other line "b" shows the rotational speed of a power turbine equipped with a conventional type of a closed loop system. As shown by the line "a" in FIG. 10, when the rotational speed is maintained at 105% of the rated rotational speed (100%) during the idling operation, the decrease of the rotational speed from the rated rotational speed after the connection of load is reduced to a relatively small one compared to that of line "b" in which the rotational speed is maintained at the rated speed (100%) during the idling operation. Now it is understood that this method of raising the rotational speed during the idling state from the rated speed is advantageous for suppressing the decrease of rotational speed of the power turbine 16 when a load is connected.

Though this method of raising the rotational speed above the rated speed during the idling operation is advantageous, it would at first seem to be disadvantageous because of overrun characteristics of the power turbine when the load is disconnected. However, if the time constant of the time lag of a first order of the delay circuit 31 shown in FIGS. 2, 3 and 4 is selected between two and ten seconds, this method according to the present invention does not provide any worse overrun characteristics than that of a conventional type of a closed loop system.

The converter 30 includes the limiting circuit as described before and above-mentioned characteristics of rotational speed shown in FIGS. 8, 9, 10 are obtained. However, the converter 30 may not include such a limiting circuit where the converter 30 is constructed with a proportional amplitude with which the output signal A thereof corresponds to 10% of the rated speed in response to the full load.

Figure 11:
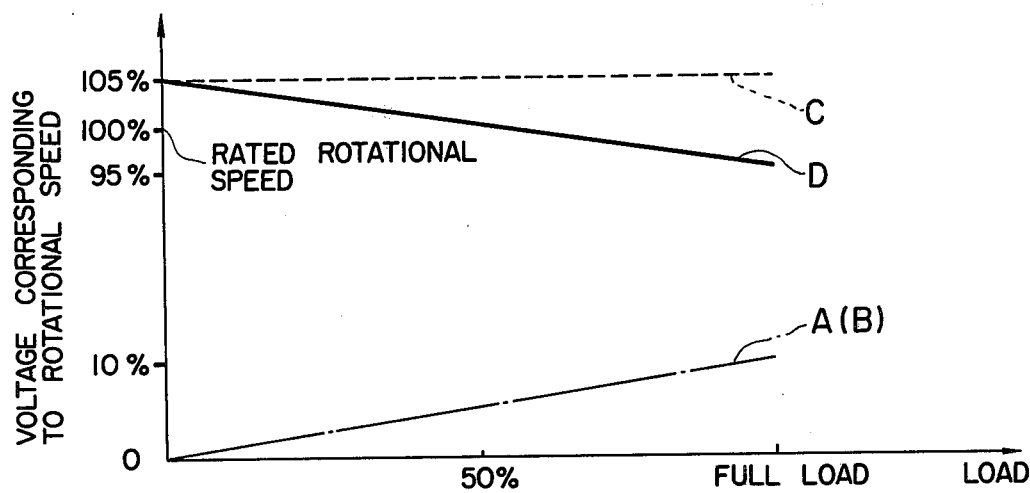
Figure 12:
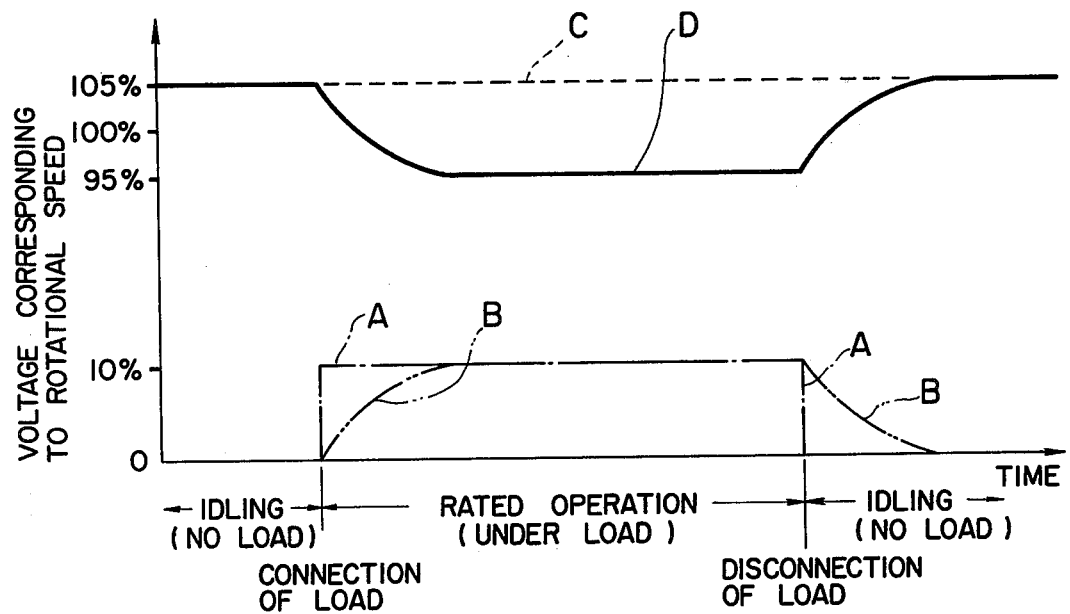

FIG. 11 and FIG. 12 illustrate signals A, B, C, D of the reference signal generator 21 shown in FIG. 2 where the converter 30 is constructed with a proportional amplitude. The signal A increases in proportion to the increase of the load and reaches a level corresponding to 10% of the rated rotational speed when the load detector 20 detects full load. Therefore the signal D decreases in accordance with the decrease of the signal A from 105% of the rated speed to 95% of same. This means that the rotational speed of the power turbine 16 shown in FIG. 1 is maintained at 95% of the rated speed under full load. Therefore when the load is disconnected, the overrun characteristics are improved compared to that shown in FIG. 9. It is to be noted that with above-mentioned arrangement of the converter 30 the improvement of both of the rotational speed characteristics of the connection and the disconnection of the load are produced.

Though the descriptions are made hereinbefore in conjunction with gas turbine engines, the concept of the invention may be employed for other prime movers such as diesel engines with a turbosupercharger.

What is claimed is:

1. A closed loop rotational speed control system for a primer mover of an electric generator, said system including, a fuel control valve for controlling the fuel flow rate supplied to the prime mover; a rotational speed sensing means for producing a signal corresponding to and representative of the rotational speed of the prime mover; and a valve control signal generator for generating a control signal with which the fuel control valve is controlled, by comparing the magnitude of the signal corresponding to and representative of the rotational speed and a reference signal; which the improvement comprises:
   (a) load detecting means for producing a first signal proportional to load of the prime mover; and
   (b) reference signal generating means for generating said reference signal in accordance with said first signal, said reference signal being selected to present a level corresponding to a higher level than a rated rotational speed of the prime mover when said first signal corresponds to no load.

2. A closed loop rotational speed control system as claimed in claim 1, wherein the reference signal generating means includes a delay circuit for producing the reference signal with a delay with respect to said first signal.

3. A closed loop rotational speed control system as claimed in claim 1, wherein the reference signal generating means includes a converter for producing a second signal corresponding to a given rotational speed in accordance with said first signal, a delay circuit connected to said converter for producing a third signal having a delay with respect to said second signal, a maximum value signal generator for producing a fourth signal corresponding to a higher rotational speed than said rated speed, and a subtractor connected to said delay circuit and said maximum signal generator for producing said reference signal by subtracting the magnitude of said third signal from the magnitude of said fourth signal.

4. A closed loop rotational speed control system as claimed in claim 1, wherein the reference signal generating means includes a converter for producing a second signal corresponding to a given rotational speed in accordance with said first signal, a maximum value signal generator for producing a fourth signal corresponding to a higher rotational speed than a rated speed, a subtractor connected to said converter and said maximum value signal generator for producing a fifth signal by subtracting the magnitude of said second signal from the magnitude of said fourth signal, and a delay circuit connected to said subtractor for producing said reference signal having a delay with respect to said fifth signal.

5. A closed loop rotational speed control system as claimed in claim 1, wherein the reference signal generating means includes a delay circuit for producing a sixth signal having a delay with respect to said first signal, a converter connected to said delay circuit for producing a seventh signal corresponding to a given rotational speed in accordance with said sixth signal, a maximum value signal generator for producing a fourth signal corresponding to a higher rotational speed than said rated speed, and a subtractor connected to said converter and said maximum value signal generator for producing said reference signal by subtracting the magnitude of said seventh signal from the magnitude of said fourth signal.

6. A closed loop rotational speed control system as claimed in claim 2, wherein the delay circuit is constructed by a circuit having a time lag of a first order and has a time constant of two to ten seconds.

7. A closed loop rotational speed control system as claimed in claim 3, wherein the maximum value signal generator is a voltage divider producing a voltage corresponding to a rotational speed higher than the rated rotational speed.

8. A closed loop rotational speed control system as claimed in claim 3, wherein the converter includes a limiter circuit for producing said second signal proportional to said first signal when the magnitude of said first signal is less than a predetermined voltage and producing said second signal same as the predetermined voltage when the magnitude of said first signal is greater than said predetermined voltage.

9. A closed loop rotational speed control system as claimed in claim 3, wherein the converter includes a proportional amplifier for producing said second signal the magnitude of which is proportional to said first signal where the magnitude of said second signal is limited below a level corresponding to a rotational speed which is smaller than the rated rotational speed upon presence of said first signal corresponding to a full load.

10. A closed loop rotational speed control system as claimed in claim 1, wherein said load detector includes a voltage detector for producing an eighth signal indicating an instantaneous voltage of the output of said generator, a current detector for producing a ninth signal indicating an instantaneous current of the output of said generator and a multiplier connected to said voltage detector and said current detector for producing said first signal by multiplying said fifth and sixth signals.

* * * * *